US012238359B2

(12) United States Patent
Babu et al.

(10) Patent No.: US 12,238,359 B2
(45) Date of Patent: Feb. 25, 2025

(54) METHODS AND APPARATUS FOR LIVE TEXT-BASED CONVERSATION BETWEEN SMALL AND LARGE GROUPS

(71) Applicant: Kiswe Mobile Inc., Rockville, MD (US)

(72) Inventors: Murali Thimma Selvan Babu, Ithaca, NY (US); DeVon Lineman, Rahway, NJ (US); Wim Sweldens, Summit, NJ (US)

(73) Assignee: Kiswe Mobile Inc., Rockville, MD (US)

( * ) Notice: Subject to any disclaimer, the term of this patent is extended or adjusted under 35 U.S.C. 154(b) by 193 days.

(21) Appl. No.: 17/582,617

(22) Filed: Jan. 24, 2022

(65) Prior Publication Data

US 2022/0239969 A1 Jul. 28, 2022

Related U.S. Application Data

(60) Provisional application No. 63/140,564, filed on Jan. 22, 2021.

(51) Int. Cl.
*H04N 21/2665* (2011.01)
*G06F 40/205* (2020.01)
(Continued)

(52) U.S. Cl.
CPC ....... *H04N 21/2665* (2013.01); *G06F 40/205* (2020.01); *G06F 40/284* (2020.01);
(Continued)

(58) Field of Classification Search
CPC .......... H04N 21/2665; H04N 21/2187; H04N 21/23439; H04N 21/4788; G06F 40/205; G06F 40/284; G06F 40/295; H04L 51/04
See application file for complete search history.

(56) References Cited

U.S. PATENT DOCUMENTS 9,483,529 B1 * 11/2016 Pasoi ..................... H04L 51/52
9,635,431 B2 4/2017 Zane et al.
(Continued)

FOREIGN PATENT DOCUMENTS

| WO | 2017096517 A1 | 6/2017 |
| WO | 2018027237 A1 | 2/2018 |

OTHER PUBLICATIONS

Apple Inc., "Example Playlist Files for use with HTTP Live Streaming," Apple Technical Note TN2288, May 9, 2012, 19 pages.
(Continued)

*Primary Examiner* — Michael R Telan
(74) *Attorney, Agent, or Firm* — Ryan, Mason & Lewis, LLP (57) ABSTRACT

An apparatus comprises at least one processing device that includes a processor coupled to a memory. The at least one processing device is configured to receive from each of a plurality of user devices one or more corresponding messages relating to a live event, to process the received messages to determine relevance of the respective received messages to a current state of the live event, to select a subset of the received messages based at least in part on their respective determined relevance, and to control presentation of the selected subset of the received messages on at least one display at the live event. The processing, selecting, and controlling are implemented at least in part utilizing one or more algorithms, illustratively comprising at least a wall population algorithm configured to drive a video wall in a venue of the live event to support a live text-based conversation between performers and fans.

17 Claims, 2 Drawing Sheets

(51) Int. Cl.
*G06F 40/284* (2020.01)
*G06F 40/295* (2020.01)
*H04L 51/04* (2022.01)
*H04N 21/2187* (2011.01)
*H04N 21/2343* (2011.01)
*H04N 21/4788* (2011.01)

(52) U.S. Cl.
CPC ............ *G06F 40/295* (2020.01); *H04L 51/04* (2013.01); *H04N 21/2187* (2013.01); *H04N 21/23439* (2013.01); *H04N 21/4788* (2013.01)

(56) References Cited

U.S. PATENT DOCUMENTS

| | | | |
|---|---|---|---|
| 9,654,844 | B2 | 5/2017 | Kim et al. |
| 9,661,355 | B2 | 5/2017 | Ho |
| 9,832,491 | B2 | 11/2017 | Ho |
| 9,900,362 | B2 | 2/2018 | Kim et al. |
| 9,942,343 | B2 | 4/2018 | Zane et al. |
| 10,182,270 | B2 | 1/2019 | Kim et al. |
| 10,419,513 | B2 | 9/2019 | Kim et al. |
| 10,438,448 | B2 | 10/2019 | Piccionielli |
| 10,887,646 | B2 | 1/2021 | Zane et al. |
| 10,911,827 | B2 | 2/2021 | Ho et al. |
| 10,997,240 | B1* | 5/2021 | Aschner ................ H04L 67/535 |
| 11,051,050 | B2 | 6/2021 | De Decker et al. |
| 2004/0226047 | A1 | 11/2004 | Lin et al. |
| 2007/0279494 | A1 | 12/2007 | Aman et al. |
| 2008/0046352 | A1 | 2/2008 | Jung et al. |
| 2008/0201389 | A1 | 8/2008 | Cohen et al. |
| 2008/0304571 | A1 | 12/2008 | Tsukagoshi et al. |
| 2011/0026900 | A1 | 2/2011 | Lussier et al. |
| 2011/0090897 | A1 | 4/2011 | Johnson et al. |
| 2011/0173638 | A1 | 7/2011 | Nakamae |
| 2011/0202967 | A1 | 8/2011 | Hecht et al. |
| 2011/0238495 | A1 | 9/2011 | Kang |
| 2012/0089681 | A1* | 4/2012 | Chowdhury ............ H04L 67/55 709/206 |
| 2012/0117584 | A1 | 5/2012 | Gordon |
| 2012/0320013 | A1 | 12/2012 | Perez et al. |
| 2013/0336412 | A1 | 12/2013 | Erofeev et al. |
| 2014/0013200 | A1* | 1/2014 | White .................. H04N 21/235 715/230 |
| 2014/0129942 | A1 | 5/2014 | Rathod |
| 2014/0136546 | A1* | 5/2014 | Satalkar ............. G06F 16/9535 707/769 |
| 2014/0188997 | A1 | 7/2014 | Schneiderman et al. |
| 2014/0240578 | A1 | 8/2014 | Fishman et al. |
| 2014/0281001 | A1 | 9/2014 | Harrison et al. |
| 2014/0297815 | A1 | 10/2014 | Rajapakse |
| 2014/0344334 | A1 | 11/2014 | Trachtenberg et al. |
| 2014/0351045 | A1 | 11/2014 | Abihssira et al. |
| 2015/0092106 | A1 | 4/2015 | Savare et al. |
| 2015/0135234 | A1 | 5/2015 | Hall |
| 2015/0297949 | A1 | 10/2015 | Aman et al. |
| 2015/0312354 | A1 | 10/2015 | Boyle et al. |
| 2015/0331856 | A1* | 11/2015 | Choi ..................... G06Q 50/01 707/746 |
| 2015/0341528 | A1 | 11/2015 | Ren |
| 2016/0110433 | A1 | 4/2016 | Sawhney et al. |
| 2016/0154556 | A1* | 6/2016 | Cheung ................ H04L 51/216 715/752 |
| 2016/0173557 | A1 | 6/2016 | Lee et al. |
| 2016/0295293 | A1 | 10/2016 | McLaughlin |
| 2017/0024094 | A1 | 1/2017 | Gresham et al. |
| 2017/0061476 | A1* | 3/2017 | Manouchehri .......... G06F 16/48 |
| 2017/0083817 | A1* | 3/2017 | Di Sciullo ............ G06F 40/205 |
| 2017/0110152 | A1 | 4/2017 | Hundemer |
| 2017/0127126 | A1 | 5/2017 | Strein et al. |
| 2017/0142451 | A1 | 5/2017 | Xu et al. |
| 2017/0214945 | A1 | 7/2017 | Chang |
| 2018/0077467 | A1 | 3/2018 | Novobilski |
| 2018/0198641 | A1 | 7/2018 | Gilani et al. |
| 2018/0220165 | A1 | 8/2018 | Shaw et al. |
| 2018/0316939 | A1 | 11/2018 | Todd |
| 2019/0079934 | A1* | 3/2019 | Liao ...................... G06F 16/248 |
| 2019/0102374 | A1* | 4/2019 | Tiwari .................. G06F 40/284 |
| 2019/0121866 | A1* | 4/2019 | Garg ...................... H04L 51/52 |
| 2019/0164135 | A1 | 5/2019 | Bellary et al. |
| 2019/0213423 | A1 | 7/2019 | Haberstroh et al. |
| 2020/0204834 | A1 | 6/2020 | Loheide et al. |
| 2020/0404344 | A1* | 12/2020 | Bathory ................. G06F 3/165 |
| 2021/0136451 | A1 | 5/2021 | Ho et al. |
| 2021/0314632 | A1 | 10/2021 | De Decker et al. |
| 2023/0328330 | A1* | 10/2023 | He ..................... H04N 21/4788 725/37 |

OTHER PUBLICATIONS

J. Devlin et al., "BERT: Pre-training of Deep Bidirectional Transformers for Language Understanding," arXiv:1810.04805v2, May 24, 2019, 16 pages.

M. Abadi et al., "TensorFlow: Large-Scale Machine Learning on Heterogeneous Distributed Systems," arXiv:1603.04467v2, Mar. 16, 2016, 19 pages.

F. Pedregosa et al., "Scikit-learn: Machine Learning in Python," Journal of Machine Learning Research, vol. 12, Oct. 2011, pp. 2825-2830.

A. Paszke et al., "PyTorch: An Imperative Style, High-Performance Deep Learning Library," arXiv:1912.01703v1, Dec. 3, 2019, 12 pages.

* cited by examiner

FIG. 1

METHODS AND APPARATUS FOR LIVE TEXT-BASED CONVERSATION BETWEEN SMALL AND LARGE GROUPS

RELATED APPLICATION

The present application claims priority to U.S. Provisional Patent Application Ser. No. 63/140,564, filed Jan. 22, 2021 and entitled "Methods and Apparatus for Live Text-Based Conversation between Small and Large Groups," which is incorporated by reference herein in its entirety.

FIELD

The field relates generally to live video, text and other types of media content, and more particularly to processing of media content.

BACKGROUND

Because of the COVID lockdown, many events have become virtual. Good examples are live music and sports events. Many live sporting events happen today in strangely empty stadiums and arenas. An event without fans lacks the excitement and emotions around a live game. Fans love to see athletes perform, but athletes need their fans just as much. Just imagine the moment when a pole vault athlete asks the crowd to cheer them on right before their jump. The same jump in an empty arena comes off a little like practice with fairly low stakes—it's even eerie.

Leagues, teams and venues have spent the last few months trying several different solutions to the lack of fan presence. They range from putting inflatable dolls in a stadium, to adding artificial crowd noise, to expanding a Zoom call to a few hundreds of people. None of these are completely satisfactory. Existing commercial chat or video conferencing systems break down when the number of participants becomes large.

Similar issues arise in the case of sporting events, concerts and other live events that have a substantial in-person audience but a potentially much larger remote audience.

SUMMARY

In some embodiments disclosed herein, systems are configured with a recognition that for each fan to feel like he or she is actually actively participating in the event rather than passively consuming it, such fans have to have an opportunity—albeit small—to influence the event in a manner similar to a physical attendance. For this to work most effectively, in some embodiments, every single fan should have this same or similar opportunity rather than only a small number of carefully preselected fans.

Illustrative embodiments of the present disclosure provide for live text-based conversation between small and large groups, where the small group may be, for example, one or more performers taking part in a live performance in an arena or other performance venue, and the large group may be, for example, a very large number of geographically-distributed fans that are remotely watching the live performance, illustratively on the order of thousands or millions of fans. The geographically-distributed fans in some embodiments can also include fans that are physically present in the performance venue, in those situations where physical presence of fans is permitted.

In one embodiment, an apparatus comprises at least one processing device that includes a processor coupled to a memory. The at least one processing device is configured to receive from each of a plurality of user devices one or more corresponding messages relating to a live event, to process the received messages to determine relevance of the respective received messages to a current state of the live event, to select a subset of the received messages based at least in part on their respective determined relevance, and to control presentation of the selected subset of the received messages on at least one display at the live event.

The processing, selecting, and controlling in some embodiments are implemented at least in part utilizing one or more algorithms. For example, the one or more algorithms illustratively include at least a wall population algorithm configured to drive a video wall in a venue of the live event to support a live text-based conversation between a relatively small group of performers at the live event and a relatively large group of fans remotely viewing the live event on respective user devices.

As a more particular example, some illustrative embodiments allow a relatively large group of people, potentially numbering in the millions, to interact in a highly effective manner via live text-based conversation with a relatively small group of people, say on the order of tens or fewer people. A typical use case scenario is when a music band performs a live show with millions of people watching online and participating in chat. This can be done for example by putting a large video wall in front of the performers that shows the texts from the fans. In between songs, the musicians want to interact with the virtual crowd similar to how they interact in a traditional in-person performance. This includes conversations like "How do you like the show so far", "Which song would you like to hear next", etc. Other examples could include sports performances where the fans want to cheer and encourage the athletes on the field or court.

These and other illustrative embodiments include but are not limited to methods, apparatus, systems, processing devices, integrated circuits, and computer-readable storage media having computer program code embodied therein.

DETAILED DESCRIPTION

Embodiments of the disclosure will be illustrated herein in conjunction with exemplary information processing systems that include particular arrangements of processing devices, processing platforms, networks and other components. It should be understood, however, that embodiments of the disclosure are more generally applicable to a wide variety of other types of information processing systems and associated devices, platforms, networks and other components. Moreover, although illustrative embodiments are described in the context of live text-based conversations, other embodiments can include additional or alternative types of content. The term "content" as used herein is intended to be broadly construed so as to encompass, for example, live text, live video or other types of multimedia streams as well as other types of content that may be processed and presented using the techniques disclosed herein. Also, the term "text-based conversation" should not be viewed as being limited to text, and such a conversation can include video and other types of content, in many different combinations.

Some illustrative embodiments disclosed herein can make use of one or more of a variety of different media streaming techniques, including, by way of example, techniques for streaming of media over the Internet using hypertext transfer protocol (HTTP). More specific examples of HTTP streaming techniques include the Apple HTTP Live Streaming (HLS) protocol, Microsoft Smooth Streaming (MSS), and MPEG Dynamic Adaptive Streaming over HTTP (DASH). Various non-HTTP streaming techniques such as RTMP can additionally or alternatively be used in some embodiments disclosed herein. For example, such techniques can be utilized to implement a streaming broadcast of a live event to a large number of remote user devices in illustrative embodiments disclosed herein.

Additionally or alternatively, some embodiments are configured to utilize techniques disclosed in one or more of U.S. Pat. No. 10,887,646, entitled "Live Streaming with Remote Commentators," U.S. Pat. No. 9,635,431, entitled "Live Event Viewing via Mixed Live and On-Demand Streaming," U.S. Pat. Nos. 10,182,270 and 9,654,844, both entitled "Methods and Apparatus for Content Interaction," U.S. Pat. Nos. 9,661,355 and 9,832,491, both entitled "Virtual Immersion Via Streamed Content Adaptation," U.S. Pat. Nos. 10,419,513 and 9,900,362, both entitled "Methods and Apparatus for Reducing Latency Shift in Switching Between Distinct Content Streams," and U.S. Pat. No. 9,942,343, entitled "Efficient Content Streaming Utilizing Local Proxy Server Implemented on Client Device," each of which is incorporated by reference herein in its entirety. It is to be appreciated, however, that utilization of such techniques is not a requirement in any particular illustrative embodiment.

Figure 1:
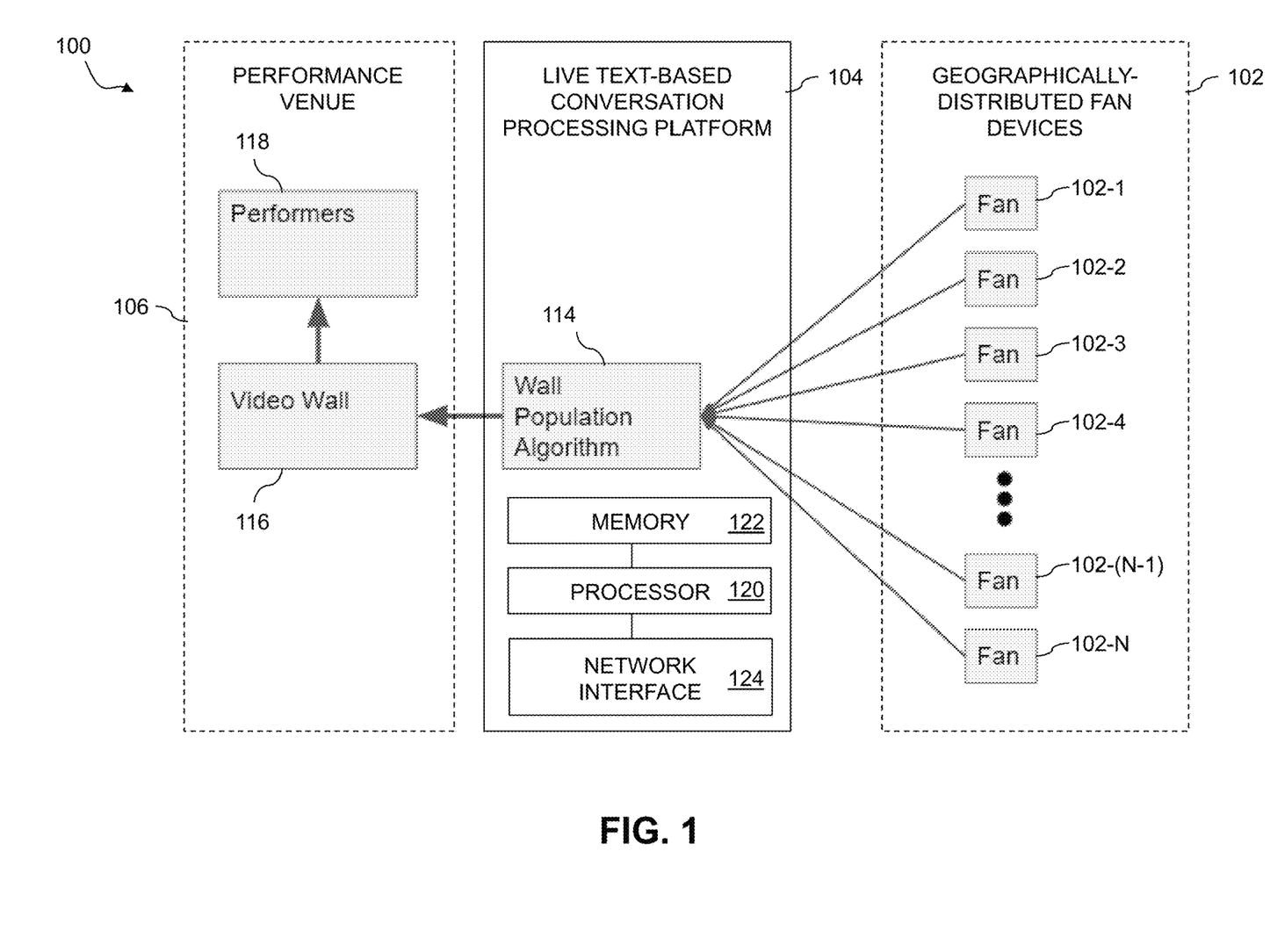
FIG. 1 is a block diagram of an exemplary information processing system with functionality for live text-based conversation between small and large groups in an illustrative embodiment.

FIG. 1 shows an illustrative embodiment of an information processing system 100 implementing functionality for live text-based conversations between small and large groups as disclosed herein. The system 100 comprises a relatively large number of fan devices 102, individually denoted as 102-1, 102-2, 102-3, 102-4, . . . 102-(N−1), 102-N, each illustratively configured to communicate with a live text-based conversation processing platform 104, and each illustratively associated with a different fan that is remotely viewing a live performance taking place in a performance venue 106, via a broadcast or otherwise. The performance venue 106 may be, for example, an arena, stadium, concert hall, television studio or other venue in which a live performance or other live event takes place.

The fan devices 102 in some embodiments can additionally or alternatively include fan devices of fans that are physically present in the performance venue 106. Accordingly, some embodiments do not require an ability for remote viewing of the live performance via broadcast or otherwise. For example, in some embodiments, the "small group" is the performers 118 and the "large group" is the fans present in the performance venue 106, viewing the event live, but nonetheless equipped with fan devices 102 through which they can send messages to the live text-based conversation processing platform 104.

It should be noted that the terms "small group" and "large group" as used herein are relative terms, and not restricted to particular numerical values or ranges in terms of their respective numbers of participants. However, the small group is typically on the order of tens of participants, while the large group is on the order of many thousands of participants, and in some cases may include millions of participants.

The fan devices 102 illustratively comprise respective personal computing devices, such as personal computers, tablets, or smartphones, suitable for providing text, video and other types of media content over the Internet or other networks. Such fan devices 102 are examples of what are more generally referred to herein as "user devices."

The fan devices 102 communicate over one or more networks with the processing platform 104 that is configured to process texts, video and other data received from the fan devices 102 in support of live text-based conversation for a live performance or other event taking place in a performance venue 106 as disclosed herein.

The processing platform 104 in some embodiments illustratively comprises a cloud-based processing platform, but in other embodiments can be at least in part physically located in the performance venue 106. Accordingly, the processing platform 104 can be implemented utilizing at least one of cloud infrastructure remote from the performance venue and one or more processing devices deployed at or near the performance venue 106.

The processing platform 104 implements a wall population algorithm 114 that drives a video wall 116 within the performance venue 106. The video wall 116 is visible to the performers 118 in the performance venue 106. The video wall 116 is also referred to herein as a "fan wall" as it presents text, video and other content provided by fans associated with respective ones of the fan devices 102. The video wall 116 is also visible to fans that may be physically present in the performance venue 106 as well as fans remotely viewing the live event via broadcast on respective ones of the fan devices 102.

For example, in some implementations of system 100, a small group of performers 118 such as athletes or musicians can watch video wall 116 in the form of a large video screen. There is a large number of fans who watch this event live typically on a digital device such as a smartphone, tablet, or laptop, but in certain cases it can also be a traditional TV. In some embodiments, it is assumed that each such fan is able to interact with the event through a corresponding user device and has the ability to participate in a group chat. That group can either be public or private. The messages in some embodiments therefore comprise chat messages or other types of text-based messages, but the term "message" as used herein is intended to be more broadly construed to cover numerous alternative formats and arrangements.

In a typical scenario there are many more messages in a time unit than can be displayed on the fan wall. So a selection needs to be made. The wall population algorithm 114 of the processing platform 104 makes that selection.

The speed at which the selected messages show up on the fan wall is important. If the speed is too high, it will be very difficult for the performers to follow the messages. If the speed is too low, the performers will not adequately feel the energy from the virtual audience. Hence the wall population algorithm 114 includes the ability to dynamically adjust the speed at which messages arrive on the wall.

The wall population algorithm 114 is driven by the relevance metric. This measures, for each message, the relevance of that message at or near that particular time or time interval in the event. This relevance metric can evolve during the event depending on the nature of the performance. The relevance of a particular message can be determined either by the context of the other messages or by the particular topic of the conversation between the small group and the large group. For example, if many people are talking about the same topic in the chat, then that topic will become more relevant and one of those messages will be selected for display on the fan wall. On the other hand, if there is a particular conversation topic—for example the band is asking "where are you all from"—then messages that include a location will be more relevant than messages which do not.

The wall population algorithm 114 in some embodiments will not only output the selected messages, but also output their respective relevance metric values. The relevance metric can then be used for innovative display options.

Examples include the following:

1. Message font could be larger depending on the relevance.

2. Certain messages could be displayed longer or "pinned." This can also be particularly relevant if the speed of the messages falls below the minimum threshold.

3. Combinations of these and other techniques. A particular message could be pinned in a large format while still a large volume of message scrolls quickly in the background. Not at a speed where they can be read but more to create a background of a large number of messages.

It should be noted that the wall population algorithm 114 in some embodiments comprises a combination of multiple distinct algorithms for implementing various types of functionality relating to processing, selecting, and controlling presentation of messages received from fan devices 102. Detailed examples of such algorithms are described elsewhere herein, and can be utilized in a wide variety of different combinations, illustratively as part of the wall population algorithm 114. The term "algorithm" as used herein is therefore intended to be broadly construed, and can comprise, for example, a wall population algorithm, one or more other algorithms that form part of or are otherwise related to a wall population algorithm, as well as additional or alternative algorithms.

The live text-based conversation processing platform 104 as shown in the figure comprises a processor 120 coupled to a memory 122 and a network interface 124.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), a graphics processing unit (GPU), a tensor processing unit (TPU) or other similar processing device component, as well as other types and arrangements of processing circuitry, in any combination.

The memory 122 stores software code for execution by the processor 120 in implementing at least portions of the functionality of the processing platform 104, such as the wall population algorithm 114. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such computer-readable storage media are considered embodiments of the present disclosure. The term "article of manufacture" as used herein should be understood to exclude transitory, propagating signals. Articles of manufacture are considered examples of "computer program products" as that term is used herein.

The network interface 124 comprises circuitry which is configured to allow the processing platform 104 to communicate with fan devices 102 and video wall 116 over one or more networks, and such circuitry illustratively comprises conventional transceivers.

The operation of the information processing system 100 will now be described in further detail with reference to the flow diagram of the illustrative embodiment of FIG. 2, which shows an example process for live text-based conversation between small and large groups implemented by the live text-based conversation processing platform 104 utilizing its wall population algorithm 114 to select particular messages and to control presentation of those messages on the video wall 116 at performance venue 106.

The process is more generally applicable to other information processing systems comprising one or more processing devices each comprising a processor coupled to a memory. Accordingly, the process can be performed using other types and arrangements of system components in other embodiments.

Figure 2:
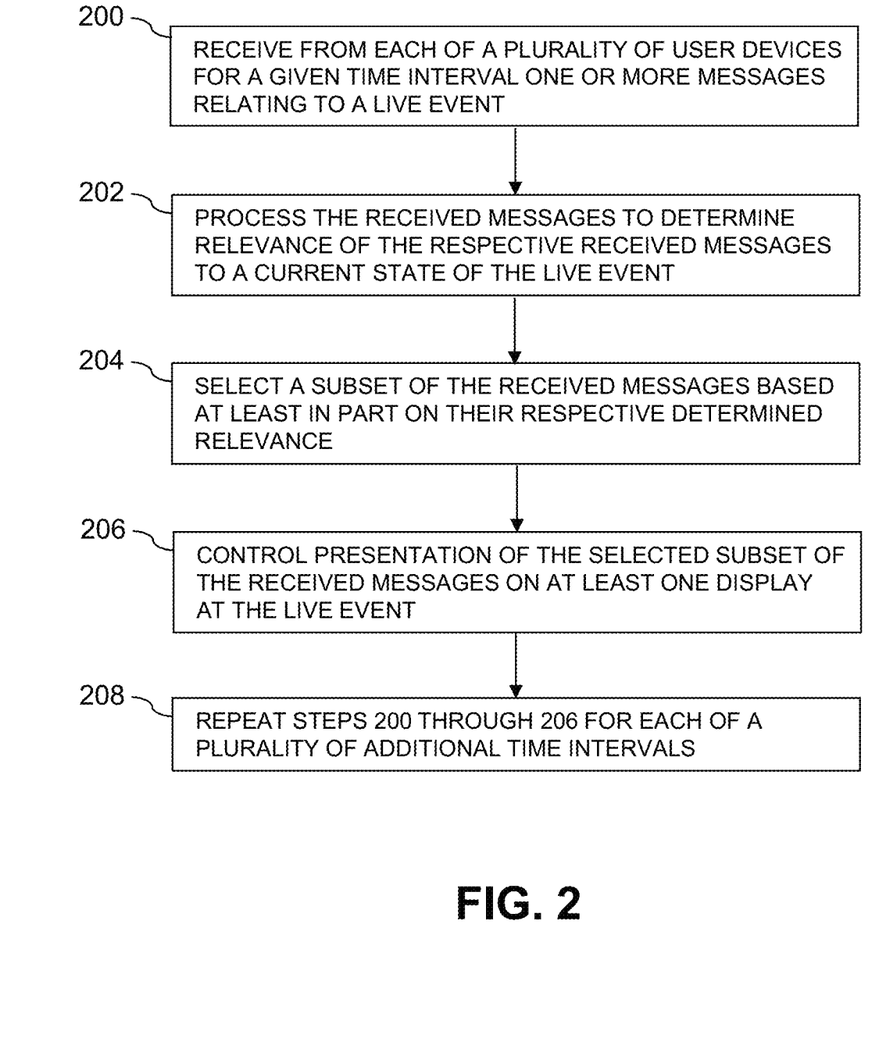
FIG. 2 is a flow diagram of exemplary process for live text-based conversation between small and large groups in an illustrative embodiment.

The live text-based conversation process illustrated in FIG. 2 includes steps 200 through 208, and is assumed to be implemented primarily by the live text-based conversation processing platform 104.

In step 200, one or more messages relating to a live event are received from each of a plurality of user devices for a given time interval. For example, the messages are illustratively received from at least a subset of the N fan devices 102. Messages can be received from fans that are remotely viewing the event via a live broadcast as well as fans that that are in attendance at the event within the performance venue 106. The messages can be received, for example, within a given time interval or received at, near or otherwise for the given time interval for processing within that time interval. Terms such as "time interval as used herein are intended to be broadly construed, and different time intervals of different types and durations can be used in illustrative embodiments herein.

In step 202, the received messages are processed to determine relevance of the respective received messages to a current state of the live event. The term "current state" as used herein is intended to be broadly construed and may represent, for example, a state within, proximate or otherwise associated with the given time interval for which the messages are received. The received messages in some embodiments are placed in one or more queues for processing. For example, in some embodiments, received messages are placed into a queue in order of receipt and then retrieved in that same order for processing to determine their respective relevance.

This processing in some embodiments initially involves performing a cleanup operation on the message to remove designated elements, such as emoji, punctuation and/or numbers, and converting all letters to lowercase, tokenizing the message by separating it into a set of words, determining a most likely language of the message, determining a sentiment score for the message, and performing entity detection to determine a word type for each of at least a subset of the words of the message. Additional or alternative initial processing operations can be used in other embodiments. Also, like other processing operations referred to herein, the particular ordering of the various parts of the above-noted example cleanup operation can be varied in other embodiments.

In some embodiments, the sentiment score for a message in some embodiments is determined by computing sentiment scores for respective words of the message, where the sentiment score for a given word comprises a value in a specified range between positive and negative limits (e.g., −1 and 1), and where positive or negative values indicate respectively positive or negative sentiment and a zero value indicates neutral sentiment. The sentiment score for the message is then computed as a function of the sentiment scores computed for the words of the message. In some embodiments, relevance of the message is determined based at least in part on the sentiment score. Other types of sentiment scores and associated processing operations can be used in other embodiments.

Additionally or alternatively, the processing to determine relevance in some embodiments involves comparing a given received message to one or more previous messages, such as messages previously selected for display on the video wall 116, in order to determine similarity of the given received message to each of the one or more previous messages. Relevance of the respective received messages can then be computed based at least in part on the determined similarity of each such message to one or more previous messages.

For example, processing the received messages to determine relevance of the respective received messages to a current state of the live event illustratively comprises, for a given one of the messages, computing a similarity score for the message based at least in part on similarity of the message to each of a plurality of other messages received for a specified lookback interval, and determining the relevance of the message based at least in part on the similarity score computed for the message, such that the more similar the message is to the plurality of other messages received for the specified lookback interval, the lower its relevance.

The similarity score for the message may be computed based at least in part on similarity of the message to a plurality of other messages actually presented on the display for the specified lookback interval.

In some embodiments, processing the received messages to determine relevance of the respective received messages to a current state of the live event comprises, for a given one of the messages, determining if the message contains at least one word that is at least one of (i) associated with one or more designated topics of a dynamically updated topics list and (ii) within a dynamically updated terms list, and computing relevance of the message based at least in part on results of the determination relating to conditions (i) and/or (ii).

Additionally or alternatively, processing the received messages to determine relevance of the respective received messages to a current state of the live event comprises, for a given one of the messages, applying the message to a machine learning algorithm implementing a classification model trained to generate relevance measures for messages applied thereto.

In step 204, a subset of the received messages are selected based at least in part on their respective determined relevance. For example, in some embodiments, relevance is computed for each of the received messages, and selecting a subset of the received messages based at least in part on their respective determined relevance comprises selecting the subset of messages based at least in part on comparison of their computed relevance to a relevance threshold. The relevance threshold in some embodiments is dynamically adjusted over time to throttle a rate at which messages are presented on the display.

In step 206, presentation of the selected subset of the received messages on at least one display at the live event is controlled.

For example, controlling the presentation of the selected subset of received messages can comprise dynamically adjusting one or more of a rate at which messages are presented on the display, a duration for which particular ones of the presented messages remain on the display subsequent to initial presentation on the display, and a format in which particular ones of the messages are presented on the display.

Additionally or alternatively, controlling presentation of the selected subset of the received messages on at least one display at the live event comprises designating one or more of the messages as respective "pinned messages" that remain presented on the display for a longer period of time than one or more other ones of the messages that are not so designated.

In some embodiments, the processing, selecting, and controlling of steps 202, 204 and 206 are implemented at least in part utilizing one or more algorithms described in more detail elsewhere herein. For example, the one or more algorithms in the context of the system 100 of FIG. 1 illustratively comprise wall population algorithm 114 configured to drive the video wall 116 at a live event in performance venue 106 to support a live text-based conversation between a relatively small group of performers at the live event and a relatively large group of fans remotely viewing the live event on respective fan devices 102. The latter group of fans can additionally or alternatively include fans that are physically present within the performance venue 106 and viewing the event live and in-person as well as possibly also viewing a broadcast of the event on their respective fan devices 102. Accordingly, at least some of the fan devices 102 from which messages are received by the processing platform 104 may be physically present within the performance venue 106.

In some embodiments, at least one of the above-noted algorithms is configured to dynamically adjust one or more of a rate at which messages are presented on the video wall 116, a duration for which particular ones of the presented messages remain on the video wall 116 subsequent to initial presentation on the video wall 116, and a format in which particular ones of the messages are presented on the video wall 116.

In step 208, steps 200 through 206 are repeated for each of a plurality of additional time intervals. For example, different sets of messages are illustratively received for each of a plurality of consecutive time intervals and processed for possible presentation on at least one display in the manner set forth in steps 200 through 206. The receipt and presentation of a given message need not be in the same time interval, and the disclosed arrangements can utilize a wide variety of different time-based techniques for processing messages based at least in part on relevance to a particular state of a live event.

Multiple parallel instances of the FIG. 2 process can be performed at least in part in parallel with one another for selecting and presenting messages on multiple distinct displays in a performance venue. For example, different displays may be associated with different sets of users, such as sets of fans of respective sports teams participating in a sport contest in the performance venue 106.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing live text-based conversation between small and large groups of participants. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different message selection and presentation arrangements.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Such processing devices are illustratively part of at least one processing platform comprising one or more processing devices each comprising a processor coupled to a memory. A given such processing device in some embodiments may correspond, for example, to one or more virtual machines (VMs) or other types of virtualization infrastructure such as Docker containers or Linux containers (LXCs). Processing platform 104 of the system 100 may be implemented at least in part using processing devices of such processing platforms. For example, at least portions of the processing platform 104 can be implemented using VMs or containers of cloud-based virtualization infrastructure. Various combinations of multiple processing devices, some locally deployed within the performance venue 106 and other remotely deployed within cloud infrastructure, can also be used.

Additional details of illustrative embodiments will now be described. These embodiments illustratively implement one or more algorithms for processing a relatively large number of received messages, and selecting and controlling presentation of particular messages from the large number of received messages based at least in part on relevance measures computed for the received messages.

Basic Algorithm Components

The wall population algorithm 114 in some embodiments includes a plurality of distinct components, which will now be described in more detail. The symbol m denotes an individual message coming from an end user.

1. Cleanup (m): Each message m goes through a standard method of cleanup. This illustratively includes removing emoji, removing punctuation, removing numbers, and converting all letters to lowercase.
2. W=Tokenize(m): Split the message m into a list of words W. The number of words in the message m is then length(W). For an individual word in the set W, we will use the symbol w.
3. lang=Language(m): This determines the most likely language of the message m. Answers can be, for example, English, Spanish, etc. or "unknown."
4. sent=Sentiment(w): The sentiment score for a word w is a value between −1 and 1, where positive or negative values indicate respectively a positive or negative sentiment. A score of 0 is a neutral sentiment. We also define the sentiment of a message m (Sentiment(m)) as the average of the sentiment of all the words in that message.
5. ent=Entity(w): Entity detection for a word. Basically tells us what type each word is. Examples are "noun," "verb," "location," "person," "product," "language," "date," "time," "event," etc.

The particular ordering of these operations, like other sets of operations disclosed herein, can be varied in other embodiments. Examples of tools that can be used in implementing one or more of the above techniques include open source models such as StanfordCoreNLP and AllenNLP, although other types of tools could be used.

Similarity Score

Illustrative embodiments utilize a similarity score metric to determine how similar a particular message m is to messages that were previously received. To compute the metric, we use a parameter t_lookback. This determines the time interval in seconds for which we will look back for similar messages.

We first define a similarity score sim (m1,m2) between two messages m1 and m2. The similarity is illustratively defined as follows:

sim (m1,m2):
W1=tokenize(cleanup(m1))
W2=tokenize(cleanup(m2))
1_union=length(W1∪W2)
1_intersect=length(W1∩W2)
sim(m1,m2)=1_intersect/1_union With this example similarity score, the similarity score between two messages is always between 0 and 1, and the higher the similarity score, the more similar the two messages are to one another.

For a message m which arrives from an end user we define sim(m) as the average similarity score between m and any message m_0 that arrives not more than t_lookback seconds before m. Therefore, 0<=sim(m)<=1 as well.

Additionally or alternatively, similarity can be defined with a weighting coefficient which decreases as time goes by. One example is an exponentially decaying coefficient based on time passed between the two messages.

Example Wall Population Algorithm

Some versions of the wall population algorithm 114 assign relevancy of a message based on its similarity to previous messages. Basically the more similar a message is to messages already displayed, the lower its relevance.

For example, relevance could be assigned as follows:

Rel(m)=1−Sim(m)

This way relevance for a message is still always between 0 and 1.

A simple wall population algorithm 114 using this relevance sets a static threshold for the relevance score (Rel_threshold) and only displays messages that are above that score. The algorithm is as follows:

Take next incoming message m from message queue

Rel(m)=1−Sim(m)

If Rel(m)>Rel_threshold then Display(m)
Next Message

Here Display is the routine to show messages onto the fan wall. This way messages that are too similar to previously displayed messages are illustratively filtered out at least for a period of around t_lookback seconds.

This algorithm is simple but in some cases may not satisfy the example speed requirement we discussed earlier for the fan wall. The simple algorithm could easily display too many or too few messages based on the arrival rate as well as the chosen relevance threshold.

In one possible variant, we only compute the similarity between an incoming message and messages that actually have been displayed on the fan wall already. This reduces the computational complexity of the algorithm. The similarity of a message m is then the average similarity between m and any message that was actually displayed on the fan wall in the previous t_lookback seconds.

Speed Throttling Algorithms

A problem that arises in processing chat messages and other types of messages is that the number of messages arriving per interval in time (e.g., each minute) is typically variable. Because of this, the rate at which output messages are displayed should be controlled so as to provide sufficient time for readers to read or otherwise appreciate the displayed messages. Below are examples of speed throttling algorithms that we use to control the output rate of messages displayed on the fan wall.

To make sure that the fan wall displays messages at an appropriate speed (e.g., variable message rate in, fixed message rate out), we add a speed throttling component. The goal is to get close to a desired speed of s messages per second. There are multiple different ways of doing this, including the following examples.

1. Batching. We predefine a time interval t_interval and collect all the messages that arrive in that interval (e.g., 1 minute). We then compute the relevance score for all the messages and only select the top s*t_interval messages for display on the fan wall. This has the advantage that the speed will always be s and that only the most relevant messages in the interval are displayed. However, it is more computationally intensive and adds a delay of t_interval to the output.

2. Dynamic threshold. We start with an initial estimate of the threshold for relevance, and put out all messages higher than the threshold. We then regularly calculate the effective speed of the output and adjust the threshold upward or downward if we need to respectively reduce or increase the speed. For example, we look back over a certain interval and afterward determine the threshold that would have put out the right number of messages for that interval. Then we use that threshold going forward. This has the advantage that there is no delay and that it is simple to compute. The disadvantage is that the speed is not guaranteed and that if the arrival rate or relevance of messages changes quickly, the resulting speed could be off quite a bit.

3. Rate limiter. This is basically an extension of the above method. It includes two steps where the first one is a dynamic threshold which aims at a speed to be consistently higher than the desired speed. It is then followed by a brute force rate limiter which simply enforces the desired speed s. This is illustratively implemented using a technique called a "leaky bucket," although other techniques could be used. Such an arrangement guarantees the speed, is computationally simple, but might not always put out the most relevant messages.

We illustratively implement these methods in a routine which we call Throttle. For each incoming message we would calculate the relevance and then pass both on to the throttling algorithm:

Throttle (m, Rel(m))

The throttling algorithm will call the Display(m) routine on the message chosen to be displayed.

Pinned Messages

Intrinsically, speed throttling is connected to what are referred to herein as "pinned messages." Although some embodiments herein can simply display each message m that has been selected for display on the fan wall in order and in the same or similar manner, other embodiments utilize a pinned message approach that will now be described in more detail.

For example, in some embodiments, depending on the relevance of messages in a given period of time, one or more messages with the highest relevance in a given period will be "pinned" to the wall. In other words, a given such message will be "sticky" and will stay on the wall for a short period of time, but illustratively longer than one or more other messages that are not designated as pinned messages. The number of pinned messages is illustratively predetermined and the rate of output is adjusted (e.g., slowed) accordingly to accommodate the pinned message sticking on the fan wall.

Another way of implementing pinned messages is to utilize a pinned messages algorithm that for a given interval of time picks out the message that is worth pinning from all the messages in that interval of time. The pinned message algorithm can determine, for example, the most positive message, the message that is most different from others, etc.

Use of pinned messages provides a differentiated approach to displaying messages. In some embodiments, we divide the message into regular messages which display the normal way and "pinned messages." As indicated previously, pinned messages are illustratively messages that remain for a longer time on the fan wall, rather than simply scrolling with the regular messages. Each pinned message remains for a time t_pinned. A fan wall typically will have room for a small fixed number (e.g., one or two) of pinned messages. The pinned messages can also be displayed with a larger font, and/or with other variations in their respective presentation characteristics.

We use an algorithm to determine which message to display. There are a number of different approaches.

Let's consider by way of example the case of only one pinned message:

1. During each time interval t_pinned we calculate the message with the highest relevance score during that time, and display that message as a pinned message during the next interval. This can be done based on relevance computed in any of the above-described algorithm variants.

2. We can pin the message solely based on similarity—meaning we display the message which best represents the time interval conversation based on the similarity metric. We do this by first computing all pairwise similarities of the messages in the time interval. We then pin the message which has the highest number of other messages with a similarity score above a certain threshold. The threshold can be chosen, for example, as the median of the similarity scores for all messages.

Topic Detection

We can expand the algorithm further to focus on particular types of topics in the conversation. A good example is when the performer asks "Where are you from?" Clearly at that point we want to give a higher relevance to messages which contain words that designate location. That is the purpose of topic detection.

First we need to dynamically set the topics that are relevant for the conversation at a given time or time interval. We define T as the set of topics for a particular time or time interval. T can be empty at the beginning of the event. Then at the time of the "where are you from" question we can set T={'location'}. This can either be done by a human operator or done automatically through speech recognition. The set T can contain more than one topic at the same time if necessary.

Next we need to decide how the topic impacts relevance. There are a number of different options, including the following.

1. Hard decision. Basically we only display messages on the fan wall which match the topic independent of their relevance. In other words, only include messages that have a word that fits the topics. Then use relevance for each of them to determine whether or not to include the message just as before.

```
Take next incoming message m from message queue
    Rel(m) = 1 - Sim(m)
    W = Tokenize(m)
    Topic = False
    For each word w in W
        Ent = Entity(w)
        If Ent ∈ T then Topic = True
    End For
    If Topic = True then Throttle(m, Rel(m))
Next message
```

2. Soft decision. The above method might end up with too few messages displayed and could fall below the desired message speed. In that case a more blended approach is needed. This is done by rescaling the relevance based on the topic match. The resulting algorithm is below where α is a fixed constant between 0 and 1.

```
Take next incoming message m from message queue
    Rel(m) = 1 - Sim(m)
    W = Tokenize(m)
    Topic = False
    For each word w in W
        Ent = Entity(w)
        If Ent ∈ T then Topic = True
    End For
    If Topic = False then
        Rel(m) = Rel(m) * α
    End If
    Throttle(m, Rel(m))
Next message
```

This way highly relevant messages which do not meet the topic criteria still have a chance to be displayed on the fan wall.

Term Detection

Another variant of the algorithm uses a predefined set of words or terms and skews the selection to the fan wall if these terms are included in a message. Here we define H as a set of such terms. These terms could be predefined or could vary during a performance depending on the nature of the segments. For example, a predefined term could be the name of the band, a band member, a song, or an album. The terms in the set H can be set by a human operator or by an algorithm.

The structure of the algorithm is similar to the topic detection described above, and is shown below.

```
Take next incoming message m from message queue
    Rel(m) = 1 - Sim(m)
    W = Tokenize(m)
    Term = False
    For each word w in W
        If w ∈ H then Term = True
    End For
    If Term = False then
        Rel(m) = Rel(m) * β
    End If
    Throttle(m, Rel(m))
Next message
```

Here again $\beta$ is a constant between 0 and 1. If $\beta$ is set to zero, then the algorithm will display messages which contain one of the terms.

Sentiment Detection

Another method to customize the message selection is sentiment analysis. Basically we can influence the likelihood that a particular message will be displayed based on the sentiment score of that message. Again the simplest way to do this is to only include messages above a certain threshold $\gamma$.

```
Take next incoming message m from message queue
    Rel(m) = 1 - Sim(m)
    W = Tokenize(m)
    If Sentiment(m) > γ then Throttle(m, Rel(m))
Next Message
```

Machine Learning Approach

The above example methods generally involve the setting of various constants whether it is to regulate the message speed or to include terms, topics and/or sentiment analysis. However, the setting of these constants can be a tedious task. Therefore we also provide a more comprehensive approach based on a machine learning and training algorithm.

In one such embodiment, we provide a generic formula for calculating relevance of a message based on all the parameters. An example of such a formula is as follows:

$$\text{Rel}(m) = a0 * \text{Length}(m)^{b0} + a1 * \text{Sim}(m)^{b1} + a2 * \text{Sentiment}(m)^{b2} + a3 * \text{Term}(m)^{b3} + a4 * \text{Topic}(m)^{b4}$$

In this example, each of Term(m) and Topic(m) has value 0 if false and value 1 if true.

We illustratively determine the a0, ..., a4, b0, ..., b4 parameters through a learning regression process.

Step 1: Collect Learning Data

There are different ways to collect learning data about the relevancy of a particular message. These include the following.

1. Mechanical Turk. Utilize the Amazon Mechanical Turk ("MTurk") or other similar approach to locate a group of volunteers, say around a few hundred, and have them go through the messages of an event where they tag each message in a binary way as either "relevant" or "not relevant." They need to be instructed that tagging a message as relevant means that to them it would make sense to display this particular message at that time on the fan wall.

2. Collect usage statistics. During a live event, collect data from all users on the relevancy of a message. This can be done, for example, by adding a "like" or "heart" capability to each message. The number of likes of a particular message can now be seen as a proxy for how relevant this message is. This has the advantage of being able to collect a large amount of data easily, but might be more error prone as it is harder to instruct the users.

In embodiments in which the messages have "likes" or similar indicators attached, we illustratively plot the distribution of the counts of likes that each message has received and only pick the messages that received likes more than the 80th percentile value of likes. These selected messages are then marked as relevant messages and the rest of the messages that were not picked are marked as not relevant. This dataset then is then used to train one or more classification models that are used to predict relevance.

For Top x % of likes:
  Pick those messages as relevant messages and mark others as non-relevant
  Train model
  Pick best model on based on F1 score, ere the F1 score is a weighted average of precision and recall.
Step 2: Machine Learning Algorithm Once we have an annotated database of relevant and non-relevant messages, we can train a machine learning algorithm to learn the coefficients 0, . . . a4, b0, . . . , b4. For example, we can use a Bidirectional Encoder Representations from Transformers (BERT) machine learning algorithm, such as that described in J. Devlin et al., "BERT: Pre-training of Deep Bidirectional Transformers for Language Understanding," Proceedings of NAACL-HLT 2019, pp. 4171-4186, June 2019, which is incorporated by reference herein in its entirety, to train a classification model on the annotated database to achieve highly balanced accuracies. Other types of machine learning algorithms and associated classification models can be used in other embodiments, as will be appreciated by those skilled in the art.

1. Model Building through machine learning and deep learning techniques. The input features except the binary relevance will then be used to train the models with relevance as the output. The classification models that we use to train may include individual or ensembles including but not limited to one or more of the following machine learning algorithms: BERT, Logistic Regression, Support Vector Machine (SVM), Artificial Neural Network (ANN), Long Short-Term Memory (LSTM), etc., implemented through the popular open-source python libraries like Tensorflow (TensorFlow: Large-scale machine learning on heterogeneous systems, 2015. Software available from tensorflow.org), PyTorch (PyTorch: An Imperative Style, High-Performance Deep Learning Library), and Scikit-Learn (Scikit-Learn: Machine Learning in Python). The relevance, from the model perspective, is the confidence in how close it is to being relevant.

Example: Say "I love this song" gets predicted as "relevant" with a confidence of 75% given the input features. The relevance score for this message is assigned as 0.75.

2. Model Building with explicit parameter tuning. Another way to train the model is to use the training data and, through algorithmic search, set the parameters based on the features we select like sentiment, relevance, topic and length. In the case above, the parameters like a0, a1, . . . , b0, b1, . . . are set by searching through the solution space while minimizing the mean absolute error. Other error measures can be used in other embodiments.

Example: Training data has relevance as 0's and 1's. We search through the solution space for the parameters while ensuring that the resulting prediction has the lowest mean absolute error in the testing set.

The foregoing are only illustrative examples of various algorithm implementations that can be used in the wall population algorithm 114 of the processing platform 104. Other types of algorithms or combinations of multiple such algorithms may be used to determine the particular messages that are shown on the video wall 116 in order to drive a live text-based conversation between the relatively small group of performers 118 in the performance venue 106 and the potentially many millions of fans that are communicating with the processing platform 104 via their respective fan devices 102.

As is apparent from the foregoing, illustrative embodiments disclosed herein are readily scalable to very large numbers of geographically-distributed fans, on the order of tens of millions of fans or more, the majority of which are present at respective locations that are remote from a live performance venue.

It should once again be noted that the above-described arrangements are exemplary only, and alternative arrangements can be used in other embodiments. For examples, the types and arrangements of algorithms used in a given embodiment can be varied, as well as the particular algorithm steps.

A given client, server or other component in an information processing system as disclosed herein is configured utilizing a corresponding processing device comprising a processor coupled to a memory. The processor executes software code stored in the memory in order to control the performance of processing operations and other functionality. The processing device also comprises a network interface that supports communication over one or more networks.

For example, the processing platform 104 illustratively comprises one or more processing devices, each having one or more instances of processor, memory and network interface components, as illustrated in FIG. 1. Such components can be used to implement servers, and in some embodiments can comprise virtualization infrastructure such as virtual machines managed by a hypervisor, and/or Docker containers or other types of containers.

Additionally or alternatively, the fan devices 102 in some embodiments may be viewed as respective client devices, and the processing platform 104 can be implemented as one or more servers, possibly implemented at least in part in a cloud-based configuration. Embodiments can therefore be implemented using a wide variety of different processing devices. For example, the fan devices 102 may comprise desktop, laptop or tablet personal computers, smart televisions, smart watches, gaming systems and other processing devices.

As noted above, a given such processing device comprises processor, memory and network interface components.

The processor may comprise, for example, a microprocessor, an ASIC, an FPGA, a CPU, an ALU, a DSP, a GPU, a TPU or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, ROM, flash memory, magnetic memory, optical memory, or other types of storage devices in any combination.

Articles of manufacture comprising such computer-readable storage media are considered embodiments of the present disclosure. The term "article of manufacture" as used herein should be understood to exclude transitory, propagating signals. Articles of manufacture are considered examples of "computer program products" as that term is used herein.

In addition, embodiments of the disclosure may be implemented in the form of integrated circuits comprising processing circuitry configured to implement processing operations, such as algorithms of the type described elsewhere herein, for supporting live text-based conversations between small and large groups.

The particular configurations of information processing systems and their associated processing devices and other components as described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations.

It should again be emphasized that the embodiments of the present disclosure as described herein are intended to be illustrative only. Other example embodiments can be implemented utilizing a wide variety of different types and arrangements of information processing systems, processing devices, processing platforms, networks and other components, and associated processing algorithms, than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:

1. An apparatus comprising:
at least one processing device comprising a processor coupled to a memory;
wherein said at least one processing device is configured:
to receive from each of a plurality of user devices one or more corresponding messages relating to a live event, the messages being received during the live event and at least a portion of the received messages including text-based content from one or more users providing commentary on the live event as the live event is in progress;
to process the received messages to determine relevance of the respective received messages to a current state of the live event;
to select a subset of the received messages based at least in part on their respective determined relevance; and
to control presentation of the selected subset of the received messages on at least one display at the live event;
wherein controlling presentation of the selected subset of the received messages comprises dynamically selecting during the live event both a presentation size and a presentation duration for text-based content of each of one or more of the selected subset of the received messages based at least in part on the determined relevance of the corresponding message to the current state of the live event;
wherein the processing, selecting, and controlling are implemented at least in part utilizing one or more algorithms;
wherein the at least one display comprises a video wall implemented at a venue of the live event so as to be visible to performers at the live event, to fans physically present at the live event, and to fans remotely viewing the live event on respective user devices;
at least one of the one or more algorithms being configured to dynamically adjust each of (i) a rate at which messages are presented on the video wall at the live event, (ii) a duration for which particular ones of the presented messages remain on the video wall subsequent to their respective initial presentations on the video wall, and (iii) a format in which particular ones of the messages are presented on the video wall;
wherein processing the received messages to determine relevance of the respective received messages to a current state of the live event comprises for a given one of the messages:
computing a similarity score for the given message based at least in part on similarity of the given message to each of a plurality of other messages received within a specified lookback interval and presented on the video wall, the specified lookback interval for the given message comprising a designated amount of time prior to a time at which the given message was received; and
determining the relevance of the given message based at least in part on the similarity score computed for the given message, such that the more similar the given message is to the plurality of other messages received within the specified lookback interval and presented on the video wall, the lower its relevance.

2. The apparatus of claim 1 wherein the at least one processing device comprises at least a portion of a text-based conversation processing platform implemented at least in part in one or more of (i) a venue of the live event and (ii) cloud infrastructure remote from the venue of the live event.

3. The apparatus of claim 1 wherein the one or more algorithms comprise at least a wall population algorithm configured to drive the video wall at the live event to support a live text-based conversation between a group one or more of the performers at the live event and one or more of the fans remotely viewing the live event on respective user devices.

4. The apparatus of claim 1 wherein relevance is computed for each of the received messages, and selecting a subset of the received messages based at least in part on their respective determined relevance comprises selecting the subset of messages based at least in part on comparison of the computed relevance to a relevance threshold, and further wherein the relevance threshold is dynamically adjusted over time to throttle a rate at which messages are presented on the display.

5. The apparatus of claim 1 wherein computing the similarity score for the message based at least in part on similarity of the message to each of a plurality of other messages received for a specified lookback interval comprises computing the similarity score for the message based at least in part on similarity of the message to a plurality of other messages presented on the display for the specified lookback interval.

6. The apparatus of claim 1 wherein processing the received messages to determine relevance of the respective received messages to a current state of the live event comprises for a given one of the messages:
determining if the message contains at least one word that is at least one of (i) associated with one or more designated topics of a dynamically updated topics list and (ii) within a dynamically updated terms list; and
computing relevance of the message based at least in part on results of the determination relating to (i) and (ii).

7. The apparatus of claim 1 wherein processing the received messages to determine relevance of the respective received messages to a current state of the live event comprises for a given one of the messages applying the message to a machine learning algorithm implementing a classification model trained to generate relevance measures for messages applied thereto.

8. The apparatus of claim 1 wherein controlling presentation of the selected subset of the received messages on at least one display at the live event comprises designating one or more of the messages as respective pinned messages that remain presented on the display for a longer period of time than one or more other ones of the messages that are not so designated.

9. The apparatus of claim 1 wherein processing the received messages to determine relevance of the respective received messages to a current state of the live event comprises for a given one of the messages:
  performing a cleanup operation on the message to remove designated elements;
  tokenizing the message by separating it into a set of words; and
  determining a sentiment score for the message;
  wherein determining a sentiment score for the message comprises:
  computing sentiment scores for respective words of the message, where the sentiment score for a given word comprises a value in a specified range between positive and negative limits, and where positive or negative values indicate respectively positive or negative sentiment and a zero value indicates neutral sentiment; and
  computing the sentiment score for the message as a function of the sentiment scores computed for the words of the message; and
  wherein relevance of the message is determined based at least in part on the sentiment score.

10. The apparatus of claim 9 wherein processing the received messages to determine relevance of the respective received messages to a current state of the live event further comprises for the given one of the messages:
  determining a most likely language of the message; and
  performing entity detection to determine a word type for each of at least a subset of the words of the message.

11. The apparatus of claim 10 wherein performing a cleanup operation on the message to remove designated elements comprises removing emoji, punctuation and numbers, and converting all letters to lowercase.

12. A computer program product comprising a non-transitory computer-readable storage medium having computer program code embodied therein, wherein the computer program code when executed by at least one processing device causes said at least one processing device:
  to receive from each of a plurality of user devices one or more corresponding messages relating to a live event, the messages being received during the live event and at least a portion of the received messages including text-based content from one or more users providing commentary on the live event as the live event is in progress;
  to process the received messages to determine relevance of the respective received messages to a current state of the live event;
  to select a subset of the received messages based at least in part on their respective determined relevance; and
  to control presentation of the selected subset of the received messages on at least one display at the live event;
  wherein controlling presentation of the selected subset of the received messages comprises dynamically selecting during the live event both a presentation size and a presentation duration for text-based content of each of one or more of the selected subset of the received messages based at least in part on the determined relevance of the corresponding message to the current state of the live event;
  wherein the processing, selecting, and controlling are implemented at least in part utilizing one or more algorithms;
  wherein the at least one display comprises a video wall implemented at a venue of the live event so as to be visible to performers at the live event, to fans physically present at the live event, and to fans remotely viewing the live event on respective user devices;
  at least one of the one or more algorithms being configured to dynamically adjust each of (i) a rate at which messages are presented on the video wall at the live event, (ii) a duration for which particular ones of the presented messages remain on the video wall subsequent to their respective initial presentations on the video wall, and (iii) a format in which particular ones of the messages are presented on the video wall;
  wherein processing the received messages to determine relevance of the respective received messages to a current state of the live event comprises for a given one of the messages:
  computing a similarity score for the given message based at least in part on similarity of the given message to each of a plurality of other messages received within a specified lookback interval and presented on the video wall, the specified lookback interval for the given message comprising a designated amount of time prior to a time at which the given message was received; and
  determining the relevance of the given message based at least in part on the similarity score computed for the given message, such that the more similar the given message is to the plurality of other messages received within the specified lookback interval and presented on the video wall, the lower its relevance.

13. The computer program product of claim 12 wherein the one or more algorithms comprise at least a wall population algorithm configured to drive the video wall at the live event to support a live text-based conversation between one or more of the performers at the live event and one or more of the fans remotely viewing the live event on respective user devices.

14. The computer program product of claim 12 wherein processing the received messages to determine relevance of the respective received messages to a current state of the live event comprises for a given one of the messages:
  performing a cleanup operation on the message to remove designated elements;
  tokenizing the message by separating it into a set of words; and
  determining a sentiment score for the message;
  wherein determining a sentiment score for the message comprises:
  computing sentiment scores for respective words of the message, where the sentiment score for a given word comprises a value in a specified range between positive and negative limits, and where positive or negative values indicate respectively positive or negative sentiment and a zero value indicates neutral sentiment; and computing the sentiment score for the message as a function of the sentiment scores computed for the words of the message; and wherein relevance of the message is determined based at least in part on the sentiment score.

15. A method comprising:

receiving from each of a plurality of user devices one or more corresponding messages relating to a live event, the messages being received during the live event and at least a portion of the received messages including text-based content from one or more users providing commentary on the live event as the live event is in progress;

processing the received messages to determine relevance of the respective received messages to a current state of the live event;

selecting a subset of the received messages based at least in part on their respective determined relevance; and controlling presentation of the selected subset of the received messages on at least one display at the live event;

wherein controlling presentation of the selected subset of the received messages comprises dynamically selecting during the live event both a presentation size and a presentation duration for text-based content of each of one or more of the selected subset of the received messages based at least in part on the determined relevance of the corresponding message to the current state of the live event;

wherein the processing, selecting, and controlling are implemented at least in part utilizing one or more algorithms;

wherein the at least one display comprises a video wall implemented at a venue of the live event so as to be visible to performers at the live event, to fans physically present at the live event, and to fans remotely viewing the live event on respective user devices;

at least one of the one or more algorithms being configured to dynamically adjust each of (i) a rate at which messages are presented on the video wall at the live event, (ii) a duration for which particular ones of the presented messages remain on the video wall subsequent to their respective initial presentations on the video wall, and (iii) a format in which particular ones of the messages are presented on the video wall;

wherein processing the received messages to determine relevance of the respective received messages to a current state of the live event comprises for a given one of the messages:

computing a similarity score for the given message based at least in part on similarity of the given message to each of a plurality of other messages received within a specified lookback interval and presented on the video wall, the specified lookback interval for the given message comprising a designated amount of time prior to a time at which the given message was received; and determining the relevance of the given message based at least in part on the similarity score computed for the given message, such that the more similar the given message is to the plurality of other messages received within the specified lookback interval and presented on the video wall, the lower its relevance;

wherein the method is performed by at least one processing device comprising a processor coupled to a memory.

16. The method of claim 15 wherein the one or more algorithms comprise at least a wall population algorithm configured to drive the video wall at the live event to support a live text-based conversation between one or more of the performers at the live event and one or more of the fans remotely viewing the live event on respective user devices.

17. The method of claim 15 wherein processing the received messages to determine relevance of the respective received messages to a current state of the live event comprises for a given one of the messages:

performing a cleanup operation on the message to remove designated elements;

tokenizing the message by separating it into a set of words; and determining a sentiment score for the message;

wherein determining a sentiment score for the message comprises:

computing sentiment scores for respective words of the message, where the sentiment score for a given word comprises a value in a specified range between positive and negative limits, and where positive or negative values indicate respectively positive or negative sentiment and a zero value indicates neutral sentiment; and computing the sentiment score for the message as a function of the sentiment scores computed for the words of the message; and wherein relevance of the message is determined based at least in part on the sentiment score.

* * * * *